(12) United States Patent
Fischer et al.

(10) Patent No.: US 6,822,744 B1
(45) Date of Patent: Nov. 23, 2004

(54) MODULAR INTERFEROMETRIC IMAGING METHOD APPARATUS AND SYSTEM

(75) Inventors: Godi Fischer, Narragansett, RI (US); Alan Davis, Fairhaven, MA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 10/144,657

(22) Filed: May 13, 2002

Related U.S. Application Data

(60) Provisional application No. 60/293,862, filed on May 25, 2001.

(51) Int. Cl.$^7$ .................................. G01B 9/02
(52) U.S. Cl. .................. 356/477; 367/155; 356/450
(58) Field of Search ................. 356/478, 477, 356/450; 250/227.19, 227.27; 367/153, 154, 155, 156, 149

(56) References Cited

U.S. PATENT DOCUMENTS 5,959,294 A * 9/1999 Green et al. ........... 250/227.27
6,122,042 A * 9/2000 Wunderman et al. ......... 356/73

OTHER PUBLICATIONS

G. Fischer, D. Hynn "Limit Cycles in Single–Stage Delta-–Sigma Modulators" *Department of Electrical & Computer Engineering at the University of Rhode Island*, pp. 1–4 (1999).

A.J. Davis, G. Fischer, "Behavioral Modeling of Delta–Sigma Modulators" *Department of Electrical & Computer Engineering and the Weapon System Department at the University of Rhode Island*, pp. 1–18, Jul. 15, 1998.

G. Fischer, A.J. Davis, "Alternative Topologies for Sigma–Delta Modulators—A Comparative Study", *IEEE Transactions on Circuits and Systems—II: Analog and Digital Signal Processing*, vol. 44, No. 10, Oct. 1997.

R.T. Baird, T.S. Fiez, "Stability Analysis of High–Order Delta–Sigma Modulation for ACD's", *IEEE Transactions on Circuits and Systems—II: Analog and Digital Signal Processing*, vol. 41, No. 1, Jan. 1994.

* cited by examiner

*Primary Examiner*—Samuel A. Turner
*Assistant Examiner*—Patrick Connolly
(74) *Attorney, Agent, or Firm*—Gauthier & Connors LLP

(57) ABSTRACT

A modular interferometric imaging system includes a sensor array that senses a physical parameter and provides a plurality of first sensor array output signals indicative thereof. An analog die receives the plurality of first sensor array output signals, and digitizes and modulated each of the first sensor array signals to provide a plurality of digitized signals. A digital die receives the plurality of digitized signals to provide a plurality of received digitized signals, and demodulates the plurality of received digitized signals to provide a plurality of demodulated digitized signals indicative thereof. A processor receives and processes the demodulated digitized signals to provide an imaging system output signal.

4 Claims, 16 Drawing Sheets

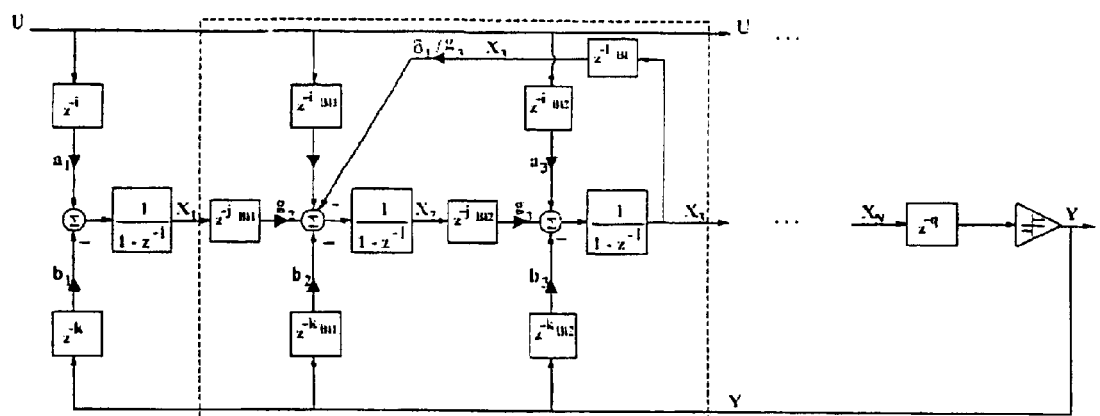
Figure 11A
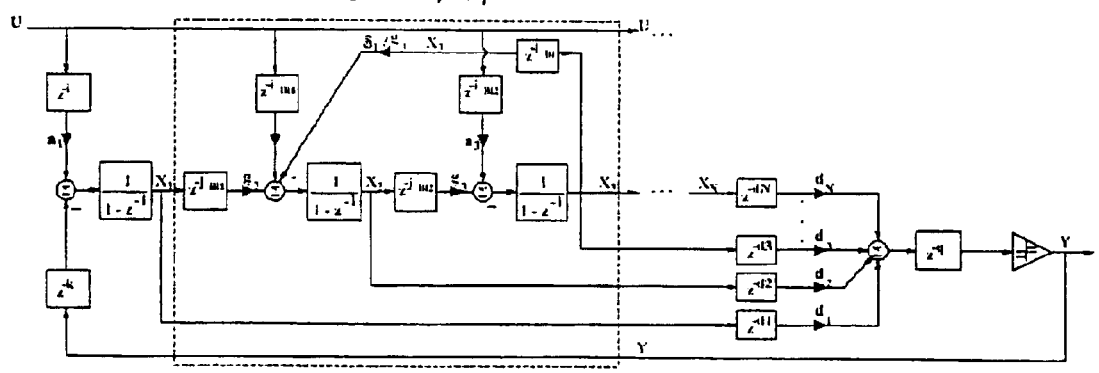
Figure 11B-

MODULAR INTERFEROMETRIC IMAGING METHOD APPARATUS AND SYSTEM

PRIORITY DATA

This application claims priority from U.S. Provisional application designated Ser. No. 60/293,862 filed May 25, 2001. This application is hereby incorporated by reference.

GOVERNMENT RIGHTS

This invention was made with U.S. Government support under Contract No. N66604-98-M-1062 from the Department of the Navy. The government may have rights in the invention.

BACKGROUND OF THE INVASION

The invention relates to devices, methods, and systems that employ interferometry to form images such as sonar imagers, radio telescopes, flow sensors, seismic monitors, etc. More particularly, the invention relates to techniques amenable to noise abatement, ruggedization, and various other benefits that flow from the modularization of components of an interferometric system.

Many interferometric receivers require high-channel count arrays, which enable the user or an autonomous system controller to make precise angular measurements for long-range detection, imaging, object classification, obstacle avoidance, etc. The operating frequencies can vary between a few Hz for seismic applications to many Megahertz or Gigahertz for ultrasound and radio systems. The sensors are usually arranged in an array in order to improve the signal to noise ratio for better detection. In such an array, the receiver hardware must be replicated for each channel. Since the number of array elements can vary from a minimum of four to several thousand, the cost for the receiver hardware can be a real burden. Furthermore, in order to perform the additional operations required for detection, for example: beam forming and multi-beam processing; each sensor output must be connected to a central signal processor. Depending on the number of array elements, this can create a serious wiring burden. Finally, since the sensors detect analog signals while the central processing unit operates in the digital domain, each channel must be equipped with a high-resolution analog-to-digital converter (ADC). The complexity of these systems limit the ability to provide for upgrades and modifications and render repairs expensive.

Therefore, there is a need for a scalable/modular imaging system.

SUMMARY OF THE INVENTION

Briefly, according to an aspect of the invention, a modular interferometric imaging system includes a sensor array that senses a physical parameter and provides a plurality of first sensor array output signals indicative thereof. An analog die receives the plurality of first sensor array output signals, and digitizes and modulated each of the first sensor array signals to provide a plurality of digitized signals. A digital die receives the plurality of digitized signals to provide a plurality of received digitized signals, and demodulates the plurality of received digitized signals to provide a plurality of demodulated digitized signals indicative thereof. A processor receives and processes the demodulated digitized signals to provide an imaging system output signal.

Integrating certain components in modular units that can be physically separated from the receiver hardware provides a scalable and modular system architecture. This has certain benefits in terms of wiring interconnects, modifiability, system expansion, ruggedness, and others. For example, separating the sensors from the electronics in oil exploration, where the sensors are large, reduces the physical size of the unit and renders it more portable. In medical imaging, portable units are needed for emergency technicians to image people at the scene, transmit the data to a computer for processing and finally to a doctor to make immediate decisions on life threatening problems. In autonomous undersea vehicles, torpedoes, towed array and submarine sonar systems, the physical space is very limited. Consequently, the sensors are frequently isolated from the remaining electronics so that their output signals must be routed to a remote ADC. By modularizing the components and multiplexing the signal interconnects, the manufacture and modification of systems can be greatly simplified and the systems ruggedized. According to an aspect of the invention, analog conditioning and digital conversion are performed within each module so that interconnects are digital. According to another aspect of the invention, the signals may be multiplexed reducing the physical channel count for interconnection. Still another refinement may be the combination of multiple sensors in a single module that may be combined with multiple other modules to form arrays of arbitrary size.

In one embodiment, the required analog and digital operations are consolidated (e.g., encapsulated) within two monolithic circuits, dies A and B, respectively. These two chips form building blocks, each of which performs signal conditioning, automatic gain control (in conjunction with an external controller), analog-to-digital conversion, multiplexing and telecommunication functions. These tasks are performed before the signals are submitted to the central processing unit.

By assembling the signal conditioning circuitry, the anti-alias filter, the ADC and the signal multiplexing operation on a single analog die, which can physically be mounted onto the same structure as the sensors, the opportunities for signal corruption are significantly reduced.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 11A and 11B each illustrate topologies for single-stage modulators;

DETAILED DESCRIPTION OF THE INVENTION

Figure 1:
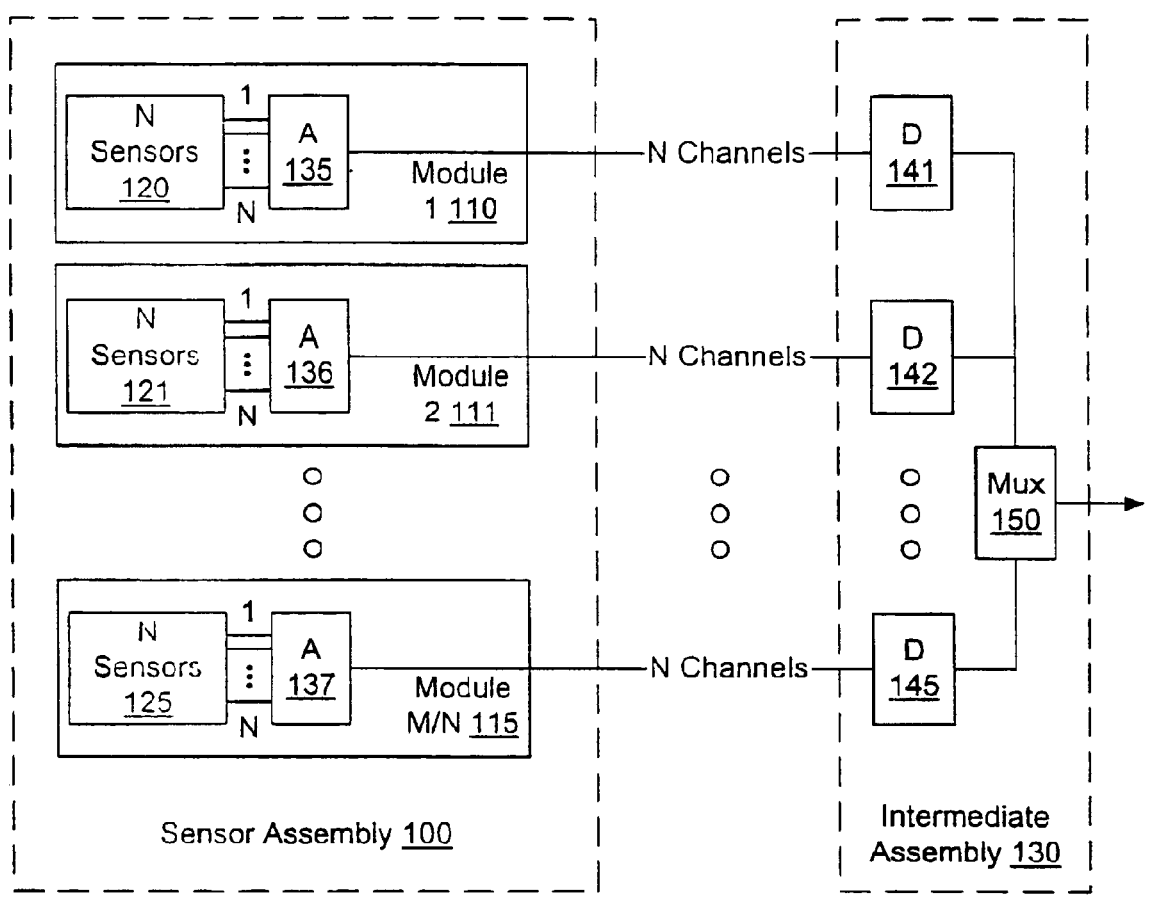
FIGS. 1–3 illustrate various embodiments of a high channel count interferometer array.
Figure 2:
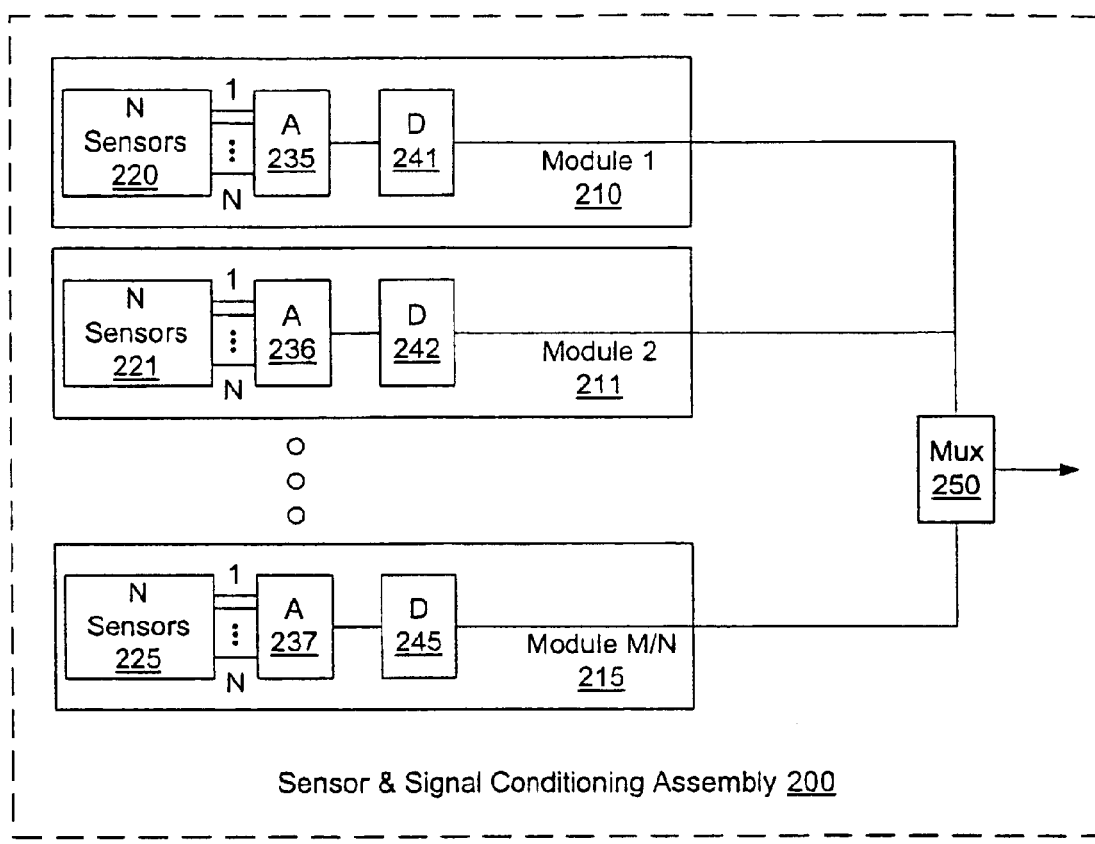
Figure 3:
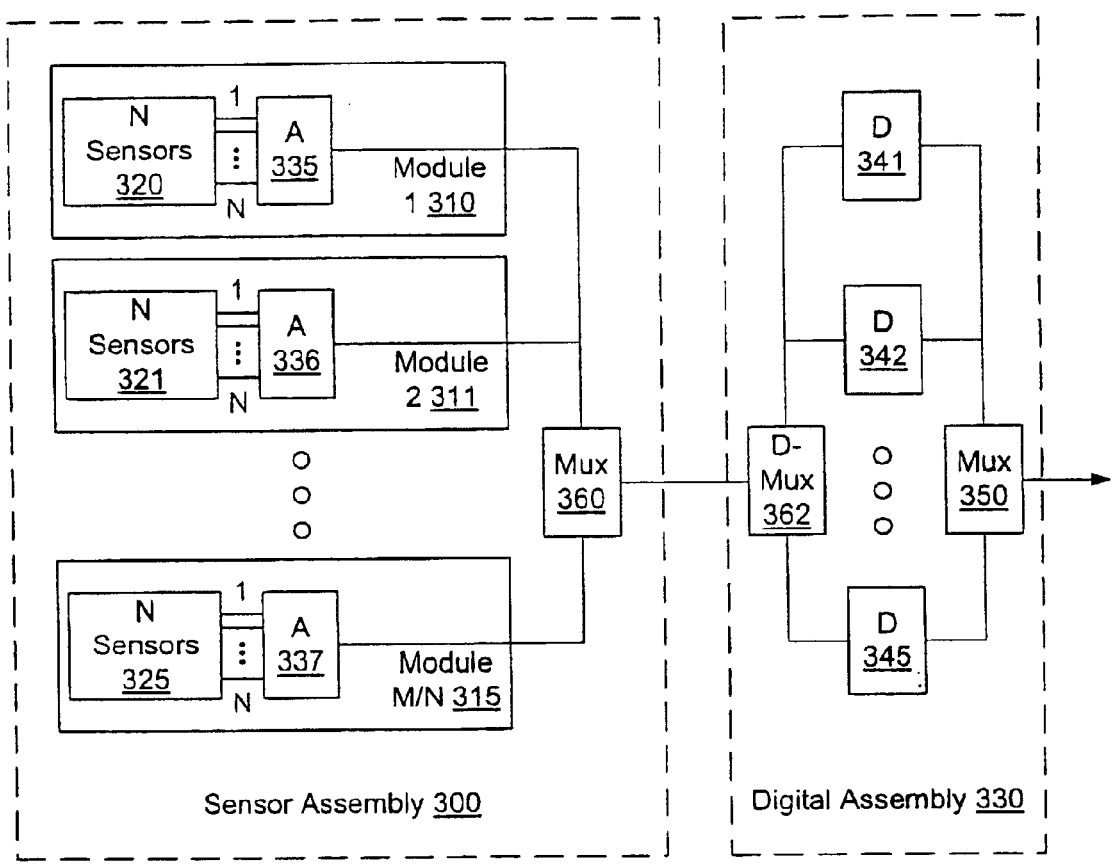
Figure 4A:
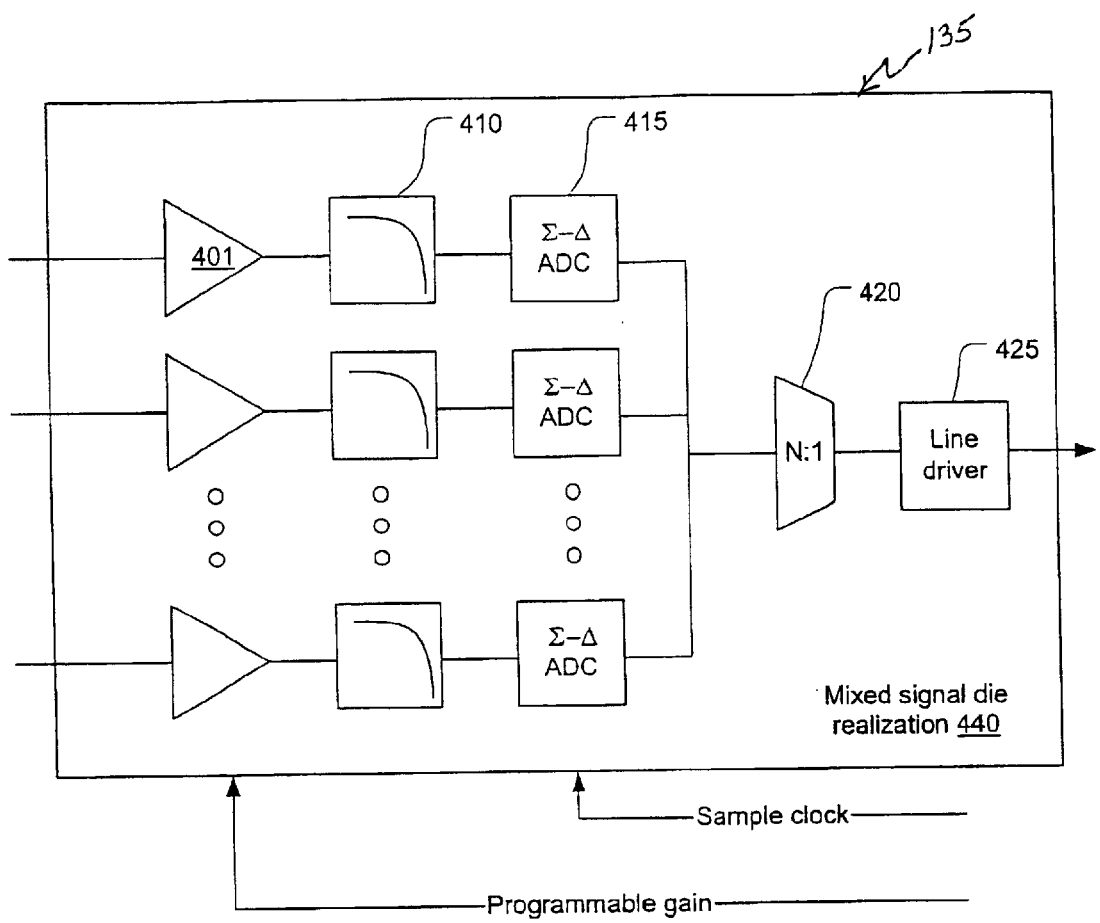
FIGS. 4A, 4B, 5A, 5B, 6A and 6B illustrate functional components corresponding variously to the embodiments of FIGS. 1–3.
Figure 4B:
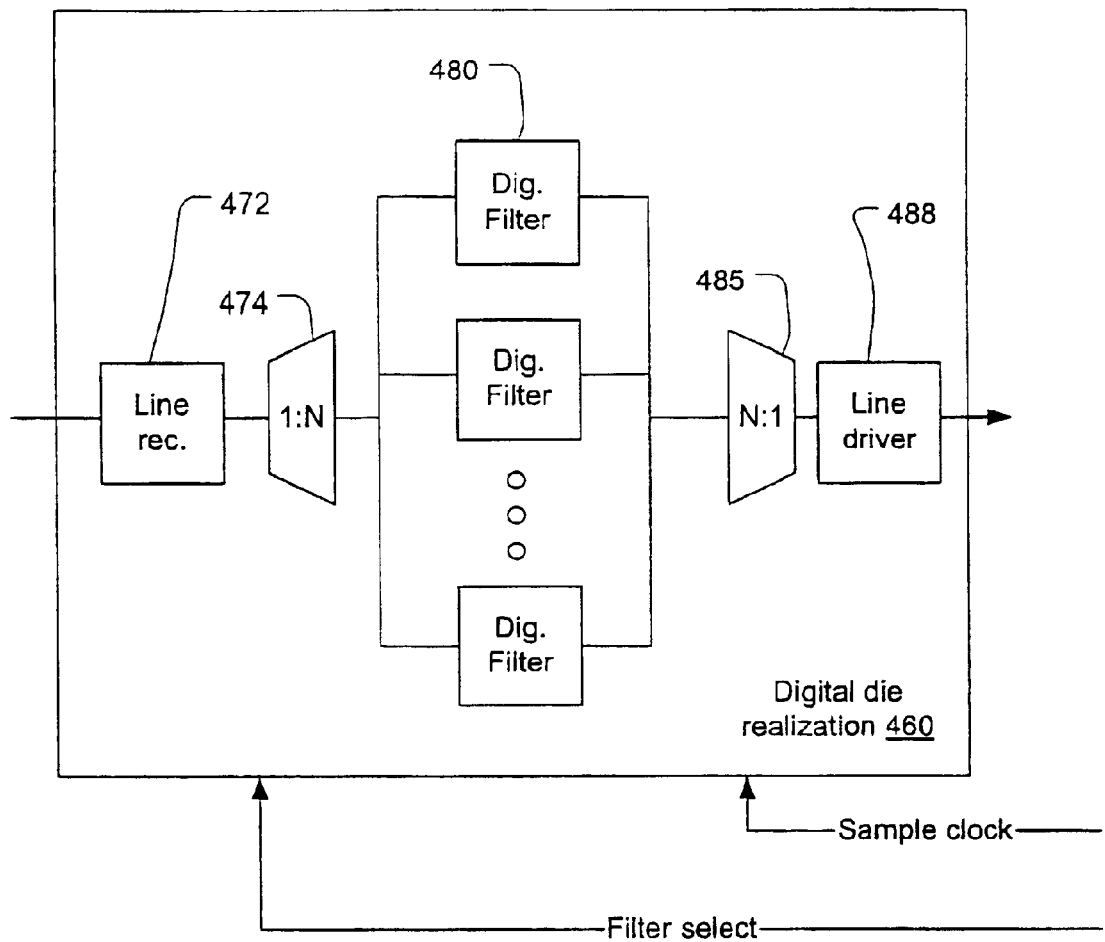
Figure 5A:
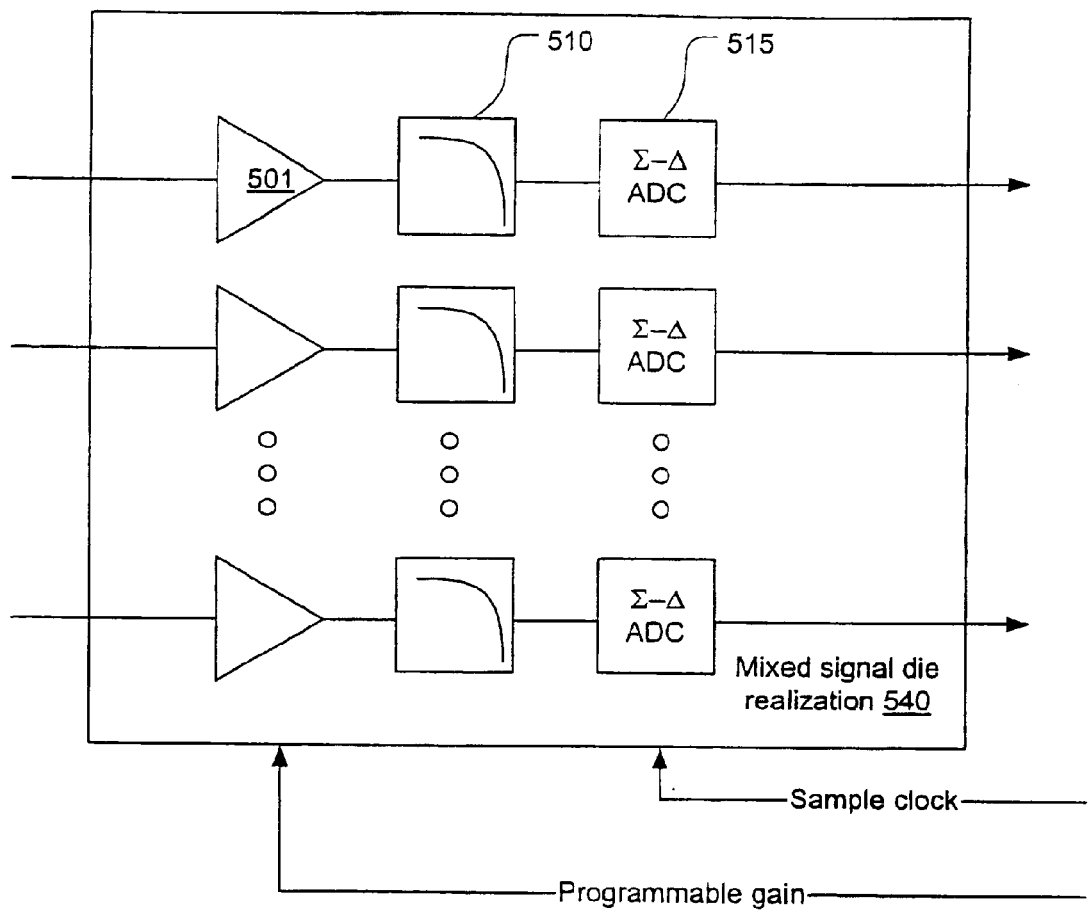
Figure 5B:
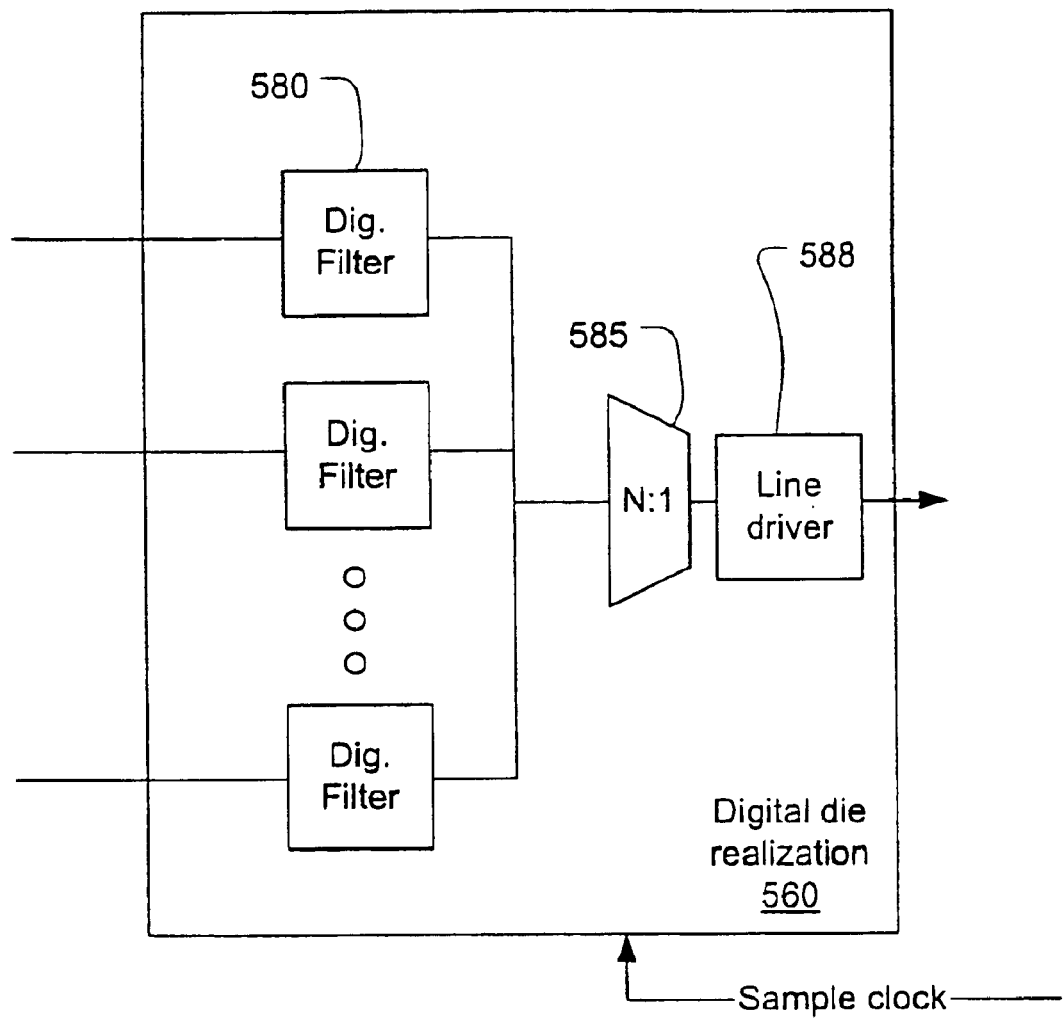
Figure 6A:
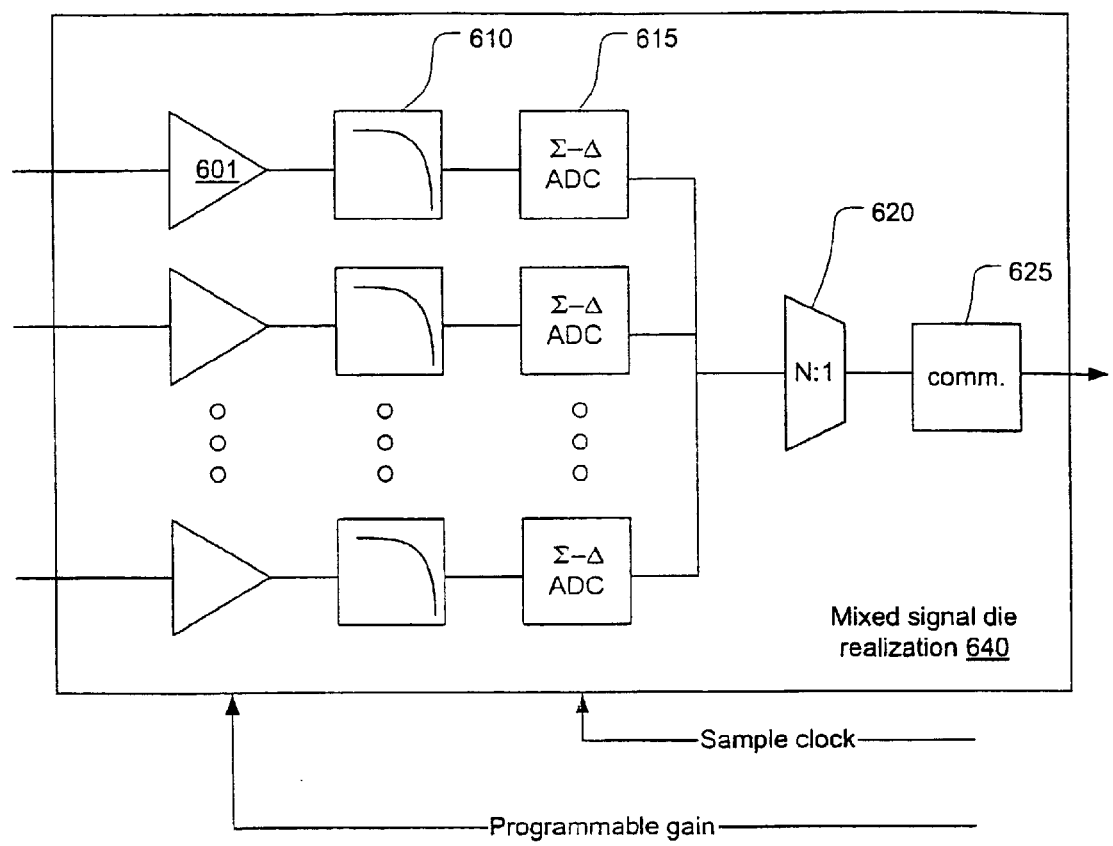
Figure 6B:
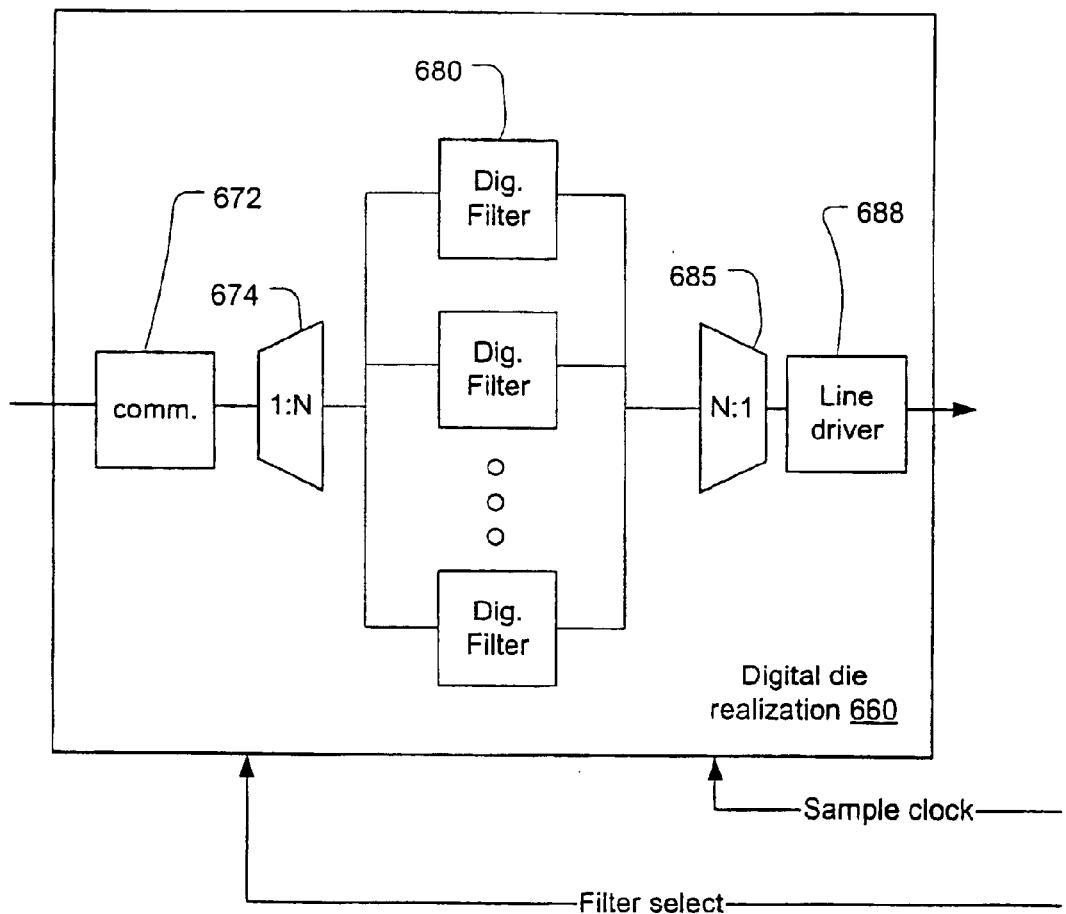

FIGS. 1–3 illustrate various embodiments of a high channel count interferometer array. FIGS. 4A and 4B respectively illustrate the corresponding functional blocks incorporated on analog dies 135–137 and digital dies 141–145 of FIG. 1. FIGS. 5A and 5B respectively illustrate the corresponding functional blocks incorporated on the analog dies 235–237 and digital dies 241–245 of FIG. 2. FIGS. 6A and 6B respectively illustrate the corresponding functional blocks incorporated on analog dies 335–337 and digital dies 341–345 of FIG. 3. The analog dies 135–137 each include a signal conditioning circuit, an anti-alias filter, an analog-to-digital converter (ADC) (e.g., a high-resolution sigma-delta ADC) and, optionally, a digital multiplexer (Mux) (each is separately illustrated in FIGS. 4A and 4B). Each of the analog dies 135–137 receives raw analog signals from a respective set of N number of sensors 120–125. Using standard techniques of sigma-delta analog digital conversion, each of the sensor's signals is amplified, low-pass filtered, and converted to a digital data stream that is multiplexed and applied to a corresponding digital die 141–145. Each of the digital dies 141–145 includes a selectable digital filter to demodulate the sigma-delta modulated output stream from a corresponding analog die 135–137.

Communications between pairs of analog dies 135–137 and digital dies 141–145, respectively, can be by any suitable communications interface such as a telecommunication interface, a network, a back plane interface for communicating with a digital computer or signal processor or any other suitable mechanism for supporting digital communications. Depending on the chosen communication protocol, the data transfer to a signal processing unit can occur over an electrical or optical wire (fiber) or via a radio transmitter.

The array in FIG. 1 is assembled from M/N number of modules 110–115 each having a set of N number of sensors 120–125. Each module's (110–115) outputs (e.g., digitized sensor signals) are applied through a suitable connection, which may be wired or wireless of any suitable description, to an intermediate assembly 130. The intermediate assembly 130 digitally reconstructs the signals of each of the M number of channels, and then transmits the data to a signal-processing unit (not shown). The sensor assembly 100 and the intermediate assembly 130 may operate within any distance of each other. Limiting the distance in some cases reduces the complexity since the intermediate assembly 100 and sensor assembly 130 are contemplated to be in the same vicinity, while signal processing may be performed at a remote location where a multiplexed combined signal from the intermediate assembly 130 is received.

The analog dies 135–137 and the digital dies 141–145 are, in a preferred embodiment, as their names imply, actual respective chips, but need not be. The analog and digital dies 135–137 and 141–145 may be replaced with respective assemblies of any suitable form, but preferably such as to permit the physical encapsulation of the sensor and electrical components in a monolithic structure with a relatively small number of physical signal interconnections. In one embodiment, a large number of individual sensor signal streams are multiplexed into a smaller number of digital channels reduced by a factor of N. The digital signals are less sensitive to interference and distortion in comparison to the analog signals from the sensors, so the encapsulation (which may or may not include potting in a single resin structure, such as polyurethane, but preferably does) of the analog components with the ADC provides clear advantages.

The intermediate assembly 130 transmits the demodulated sigma-delta data streams of each of the M number of channels to a central signal processor (not shown) by any suitable communications channel (e.g., wired or wireless). In an alternative embodiment, the intermediate assembly 130 may convert the digital format of the digital data stream from one bit per symbol to any desired number of bits per symbol.

FIGS. 4A and 4B show, functionally, the components that may be realized on the analog and digital dies 135–137 and 141–145, respectively of the embodiment of FIG. 1. The analog dies 135–137 amplify 401 and anti-alias filter 410 the respective sensor signals. Each filtered signal is then digitized, preferably by for example a sigma-delta ADC 415. The signals on each channel are then multiplexed by multiplexer 420 and transmitted by a line driver 425 to a corresponding digital die 141–145. Each of the digital dies 141–145 receives a line signal via line receiver 472. The signal is then demultiplexed (via a demultiplexer 474). Respective digital filters 480 for each channel perform the necessary demodulation, that is filtering and downconversion to base-band and generate a representation of the baseband signal for multiplexing (by multiplexer 485) and transmission, by line driver 488, to the signal processor (not illustrated). The line driver 488 may be a telecommunications circuit, optical circuit, packet network or any suitable communications channel.

The use of an intermediate assembly may be attractive for several reasons. In some systems, there may be little space for sensors and it may be useful to allow parts of the system to be located remotely from the sensor array. For example, in an obstacle avoidance system or in a hull mounted sonar, there might be little space in the hull enclosure containing the sensors. Alternatively, this system may be used as a hand held device and the intermediate electronics unit containing both the digital filter and the data transmitter to a signal processor, which may be located a great distance away from the device or, alternatively, in a backpack or belt mounted unit.

Referring now to FIG. 2, a second embodiment employs analog dies 235–237, each shown in FIG. 5A, and digital dies 241–245, each as shown in FIG. 5B. The analog dies 235–237 and the digital dies 241–245 are preferably mounted together with N number of sensors 220–225 into a single module. Rather than applying the digital signals from the analog dies 235–237 to separate digital dies 241–245, the signals are applied within the modular structure defined by a sensor and signal conditioning assembly 200. Thus, in the present system, no intermediate assembly (e.g. 130) is required. The output of the sensor and signal conditioning assembly 200 is identical to that of the output of the intermediate assembly 130 in the embodiment of FIG. 1.

FIGS. 5A and 5B show, functionally, the components that may be realized on the analog dies 235–237 and the digital dies 241–245, respectively of the embodiment of FIG. 2. The analog dies 235–237 include amplifiers 501 and filters 510 for anti-alias filtering the respective sensor signals. Each filtered signal is then digitized, preferably for example by a sigma-delta ADC 515. The conditioned and digitized signal from each sensor is then directly applied to a respective digital filter that performs the necessary demodulation, i.e. filtering and downconversion to baseband (e.g., via digital filter 580) and generates a representation of the baseband signal for multiplexing (by multiplexer 585) and transmission, by line driver 588, to the signal processor (not illustrated). The line driver 588 may be a telecommunications circuit, optical circuit, packet network or any suitable communications channel.

FIG. 3 illustrates a system where the sensor assembly and the analog dies 335–337 are configured and arranged as in the embodiment of FIG. 1, but in the present embodiment, the digitized signals from the analog dies 335–337 are applied to the digital die via a communications protocol. A communications multiplexer 360 combines the signals from the separate analog dies into a single channel, such as a telecommunications protocol. The telecommunications multiplexer 360 may be incorporated on the same chip. The corresponding digital dies 341–345 (shown in detail in FIG. 6B) includes a demodulator 362 to complete the communication channel.

In addition, the analog dies 335–337 and the digital dies 341–345 may provide outputs that can be connected directly to a computer or a back plane card rack. Typical card formats for the output are VME, FUTUREBUS, or PCI. The computer or card rack and the sensor assembly can be a great distance apart and the transmission between them can be accomplished via a wired or wireless channels.

FIGS. 6A and 6B show, functionally, the components that may be realized on the analog and digital dies 335–337 and 341–345, respectively of the embodiment of FIG. 3. The analog dies 335–337 include amplifiers 601 and anti-alias filters 610 that amplify and filter the respective sensor signals. Each of the resultant filtered signals is then digitized, preferably for example a sigma-delta ADC 615. The digitized signals on each channel are then multiplexed by a multiplexer 620 together and transmitted by a communications protocol driver 625 en masse to the digital dies 341–345. The digital dies 341–345 receive respective signals from a receiving communications interface 672, and the received signal is then demultiplexed (via a demulitplexer 674). Digital filters 680 each associated with a respective channel, perform the necessary demodulation (i.e., filtering and downconversion to base-band) and generate a representation of the baseband signal. The demodulated signals are multiplexed (by multiplexer 685) and transmitted by a line driver 688 to the signal processor (not illustrated). The line driver 688 may be a telecommunications circuit, optical circuit, packet network or any suitable communications channel.

In the above embodiments, the communication protocol can be any arbitrary communications mechanism including network protocols, proprietary protocols, any type of digital symbol representation of the samples. The Mux function and data formatting may optionally be realized in a separate die. Alternatively, the y can be realized on die B as shown in FIGS. 4B and 5B, respectively.

A preferred feature of the proposed embodiments is the utilization of a sigma-delta based ADC. Combining signal oversampling with (quantization) noise shaping enables the realization of high-resolution data converters without the need for an analog trimming process. It is thus ideally suited to a monolithic implementation of a high-resolution ADC. The modulator architecture and the order of the noise-shaping filter are strongly influenced by the maximum OSR and the desired system resolution. Consequently, a variety of different modulator configurations can be employed.

Figure 7:
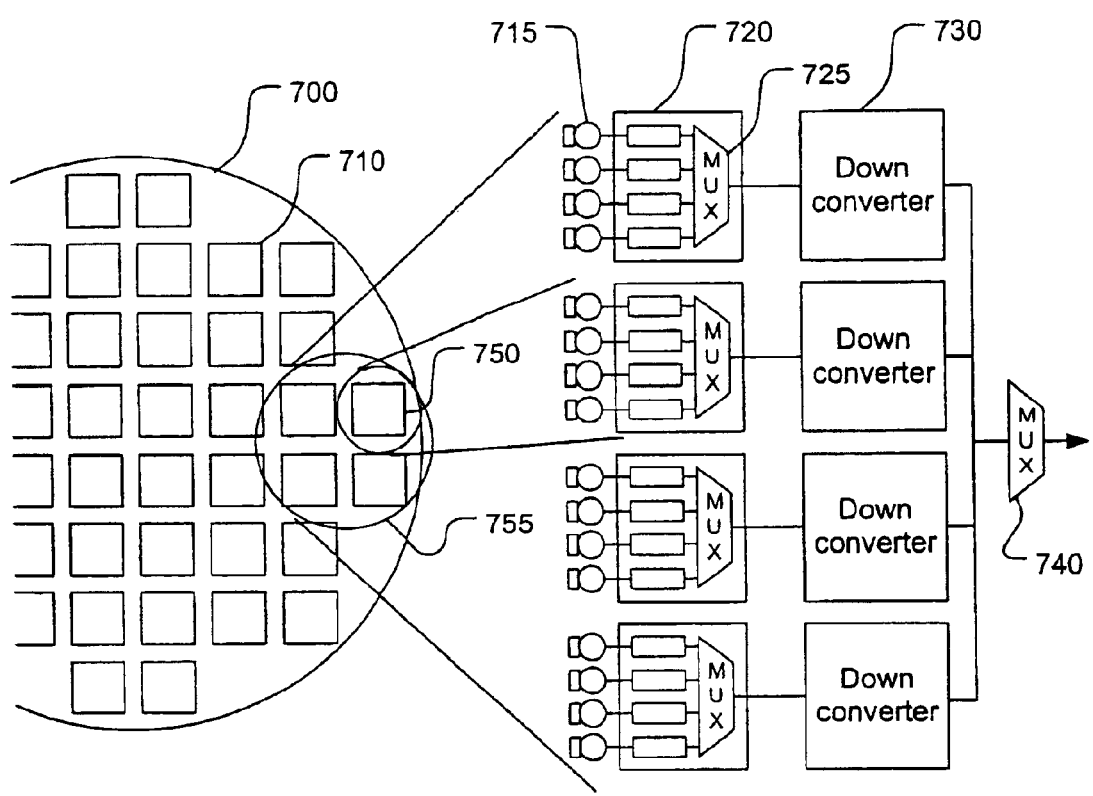
FIG. 7 illustrates an implementation of a portion of a high-resolution array (HRA) sonar system.

FIG. 7 shows an implementation of a high-resolution array (HRA) sonar system. The analog dies of the various embodiments may be manufactured as multiple chips 750 (shown for illustration on a semiconductor wafer 700) each chip 750 carrying an analog die with multiple signal conditioning channels. Each channel has a sensor input 715, and all channels on a single analog die 720 (four being shown but the number is arbitrary) are digitized and multiplexed by a multiplexer 725 for output as a single signal. The signals from each analog die 720 may then be downconverted 730 and multiplexed 740 to further combine each analog die 720 channel into a single output. By hierarchically multiplexing the signals of smaller local arrays (e.g., comprising sixteen sensor elements), the routing complexity is reduced. If the digital dies 730 employed in this system offer selective digital filters, it is possible to support simultaneously a broad band array with medium resolution and a narrow band system with correspondingly higher resolution (due to reduced noise bandwidth).

Figure 8:
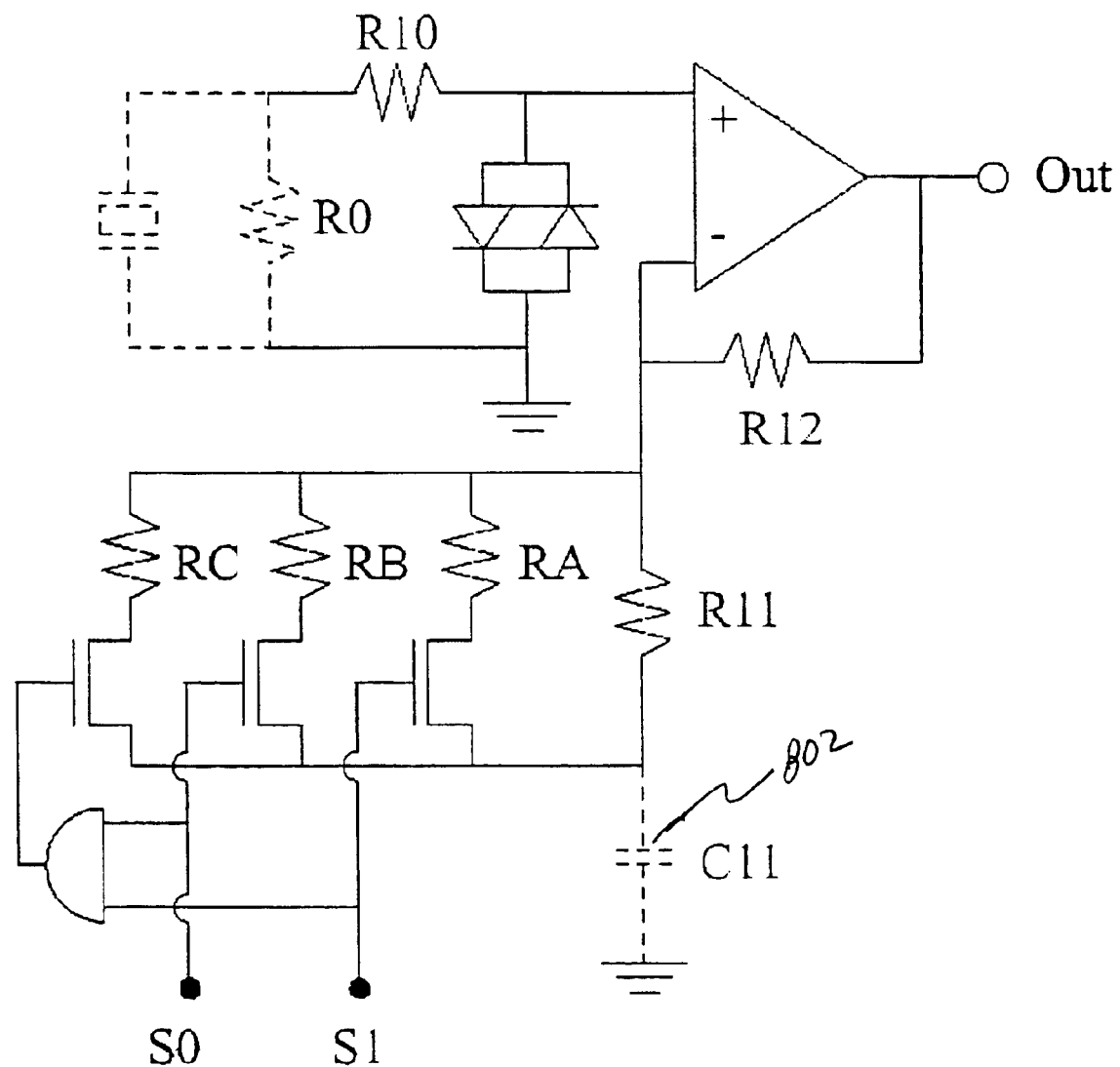
FIG. 8 is a schematic illustration of a CMOS compatible adaptive preamplifier gain stage.

In many sonar applications, it is desirable to be able to adjust the receiver gain to the power of the incoming signal. A CMOS compatible solution for such an adaptive pre-amplifier gain stage is shown in FIG. 8. The depicted circuit employs two digital control bits (yielding four discrete gain values), but can be readily expanded to a three or more bit gain control by adding the corresponding number of parallel resistors and switches. Capacitor C11 802 enables an optional low-frequency gain roll-off to prevent a system overload by low-frequency ambient noise.

The complexity of the continuous-time anti-alias filter is strongly influenced by the OSR employed in the sigma-delta ADC. Compared to a conventional data conversion system, which operates at the Nyquist rate, the sigma-delta approach enables a relaxed pre-filter design. This fact becomes important in a monolithic implementation, where the designer possesses relatively poor control over absolute element values. For example, for a system with a dynamic range of 90 dB, a conventional Nyquist rate ADC would mandate a highly selective (and thus sensitive) lowpass filter of order 10–12, while a sigma-delta based ADC with an OSR of 32 would require not more than a third-order filter. Such a low-order filter can readily be implemented in form of a power and area efficient RC active circuit. Since the on-chip RC products may be subject to 20–50% deviation due to fabrication process variations, it is advisable to increase the filter cut-off frequency correspondingly and counteract the loss in high-frequency attenuation by adding an additional filter pole.

Figure 9:
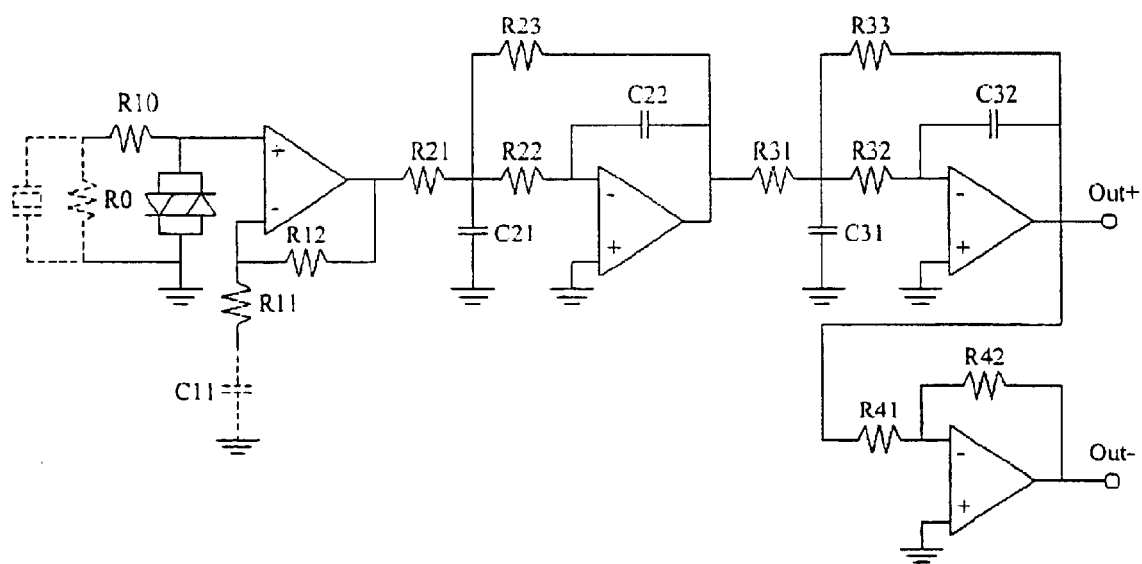
FIG. 9 is a schematic illustration of a single-ended version of a fourth-order RC active circuit.
Figure 10:
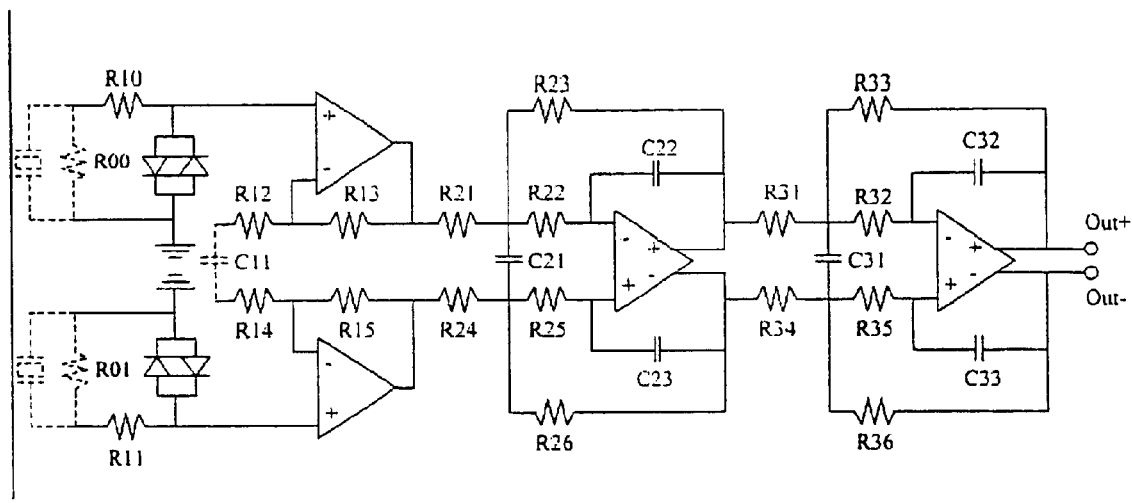
FIG. 10 is a schematic illustration of a fully differential filter with a fixed gain preamplifier stage.

FIG. 9 shows a single-ended version of a fourth-order RC active circuit, which is preceded by a fixed gain pre-amplifier stage. An alternative fully differential filter implementation with a similar fixed gain pre-amplifier stage is presented in FIG. 10. The latter solution, while more costly, may yield better noise performance due to its differential implementation.

In the analog front-end processing, it is desired to reduce the size of the circuitry as much as possible. Capacitance required for anti-alias filtering of the analog signal can have a very large total area, depending on the signal frequencies being employed. The use of higher order filters creates an opportunity to reduce the total area of the capacitance required for filtering the analog signal. This is because the cutoff frequency, being more sharply defined in a higher order filter, can be located closer to the critical Nyquist limit.

To reduce the routing complexity for the HRA system and increase the robustness of the analog die, a single-stage, single-bit modulator with a high-pass noise shaping function may be employed. FIGS. 11A and 11B depicts two alternative topologies for single-stage modulators. They are referred to as follow the leader feedback (FLF) and inverse follow the leader feedback (IFLF) configurations, respectively.

Figure 12:
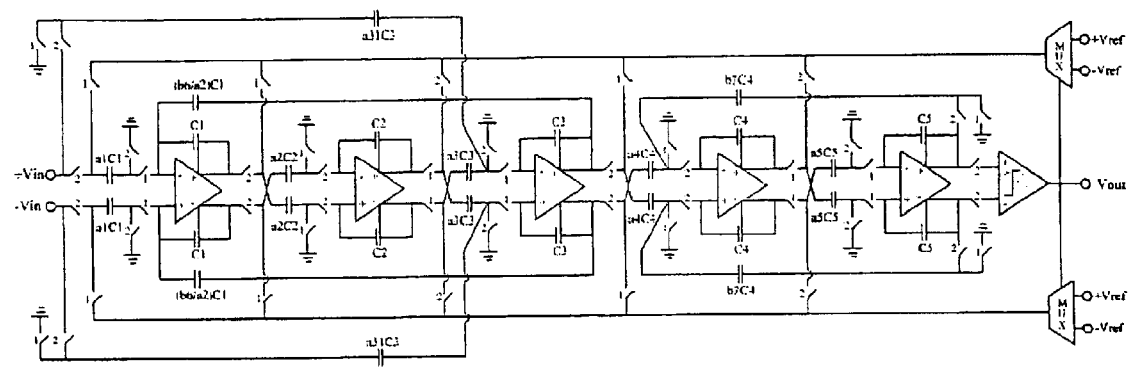
FIG. 12 is a schematic illustration of a fully differential switched-capacitor circuit realizing a fifth-order IFLF sigma-delta modulator.

FIG. 12 shows the schematic of a fully differential switched-capacitor circuit realizing a fifth-order IFLF sigma-delta modulator. By using identical coefficients for the modulator feed-forward and the feedback coefficients, this implementation minimizes the number of capacitors and switches. In addition, all coefficients represent simple integer ratios, which further simplifies the physical implementation.

Figure 13:
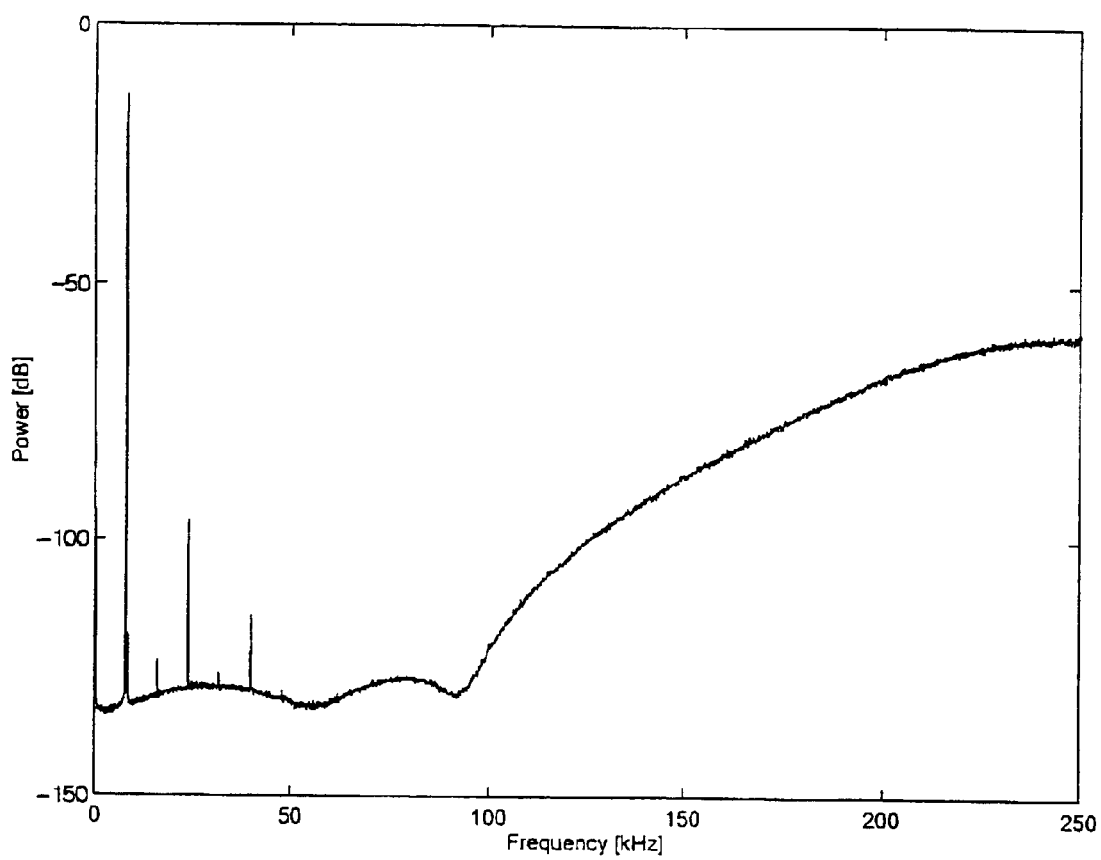
FIG. 13 illustrates a plot of a modulator output spectrum as obtained from one of the first modulator test chips of an embodiment of the invention.

FIG. 13 displays the modulator output spectrum as obtained from one of the first modulator test chips. The plot not only demonstrates the effectiveness of the implied noise shaping function but also reveals the high dynamic range of approximately 90 dB in the frequency band between dc and 100 kHz.

Although the present invention has been shown and described with respect to several preferred embodiments thereof, various changes, omissions and additions to the form and detail thereof, may be made therein, without departing from the spirit and scope of the invention.

What is claimed is:

1. A modular interferometric imaging apparatus, comprising:

a sensor array that senses acoustic signals and provides a plurality of first sensor array output signals indicative thereof;

an analog die that receives said plurality of first sensor array output signals, and digitizes and modulates each of said first sensor array signals to provide a plurality of digitized signals;

a digital die that receives said plurality of digitized signals to provide a plurality of received digitized signals, and demodulates said plurality of received digitized signals to provide a plurality of demodulated digitized signals indicative thereof; and a processor that receives and processes said demodulated digitized signals to provide an imaging system output.

2. The modular interferometric imaging apparatus of claim 1, comprising:

a multiplexer that is located on said analog die and receives said plurality of digitized signals and multiplexes said plurality of digitized signals to provide a multiplexed digital signal; and a demultiplexer that is located on said digital dies and receives and demultiplexs said multiplexed digital signal to provide said received digitized signals.

3. The modular interferometric imaging apparatus of claim 1, wherein said analog die comprises:

a plurality of parallel analog die processing channels wherein each of said plurality of processing channels receives an associated one of said first sensor array output signals, and each said channels includes a low pass filter that receives first sensor array output signals and provides a low pass filtered signals to an associated sigma-delta modulator that provides an associated one of said plurality of digitized signals.

4. The modular interferometric imaging apparatus of claim 1, wherein said digital die comprises:

a plurality of parallel digital die processing channel each having a demodulator that receives and demodulates an associated one of said plurality of digitized signals to provide said plurality of demodulated digitized signals.

* * * * *